United States Patent [19]

Cockburn

[11] Patent Number: 4,644,816
[45] Date of Patent: Feb. 24, 1987

[54] BRAKE ACTUATOR

[75] Inventor: Paul A. Cockburn, Paddington, Australia

[73] Assignee: Acrow Pty. Limited, Guildford, Australia

[21] Appl. No.: 346,836

[22] Filed: Feb. 8, 1982

[30] Foreign Application Priority Data

Feb. 20, 1981 [AU] Australia .............................. PE7679

[51] Int. Cl.$^4$ .............................................. F16C 1/10
[52] U.S. Cl. ............................... 74/501 R; 74/471 R; 74/489; 188/24.15; 188/24.18
[58] Field of Search ................. 74/501 R, 471 R, 489; 188/24.15, 24.16, 24.18, 24.22

[56] References Cited

U.S. PATENT DOCUMENTS

| | | | |
|---|---|---|---|
| 1,674,751 | 6/1928 | Luettwitz | 188/18 R |
| 3,258,298 | 6/1966 | Holland | 74/471 R |
| 3,927,247 | 8/1976 | Armstrong | 74/489 |
| 3,942,609 | 3/1976 | Hill | 188/24 |
| 4,057,127 | 11/1977 | Woodring | 188/24 |
| 4,267,746 | 5/1981 | Pruett | 74/489 |

FOREIGN PATENT DOCUMENTS

| | | |
|---|---|---|
| 419509 | 11/1937 | Belgium . |
| 440212 | 1/1941 | Belgium . |
| 1252087 | 1/1967 | Fed. Rep. of Germany ... 188/24.18 |
| 618332 | 6/1926 | France . |
| 628839 | 10/1927 | France . |
| 33033 | 6/1928 | France . |
| 692874 | 3/1930 | France . |
| 1349334 | 11/1962 | France . |
| 142911 | 5/1929 | United Kingdom ............ 74/501 R |
| 338061 | 11/1930 | United Kingdom . |

Primary Examiner—Lawrence J. Staab
Attorney, Agent, or Firm—Ladas & Parry

[57] ABSTRACT

A brake actuator for a bicycle having a front and rear brake assembly, the actuator includes a pivotally mounted handle within which is located a braking force division member, said division member being pivotally mounted and having cables extending from it which operate the brake assemblies.

3 Claims, 10 Drawing Figures

BRAKE ACTUATOR

The present invention relates to brake actuators and more particularly but not exclusively to brake actuators for wheeled vehicles such as velocipeds or motor bikes.

It is common on most bicycles that the front and rear brakes are operated separately by independent brake actuators mounted on the handle bars of the bicycle. Accordingly this well known system has the disadvantage that the cost of the actuators is almost double. Additionally it is advantageous to apply a greater breaking force to the front wheel due to weight transfer during breaking. These known braking systems cannot be easily operated so as to apply the correct breaking force to each wheel.

Such known braking systems are described in U.S. Pat. Nos. 4,267,746; 4,057,127; 1,674,751; 378,257 and 3,942,609.

It is the object of the present invention to overcome or substantially ameliorate the above disadvantages.

There is disclosed herein a brake actuator for a vehicle having a front and rear wheel and a brake assembly operatively associated with each wheel, and a brake cable extending from each assembly and coupled thereto so as to cause actuation thereof to brake the wheels, said actuator comprising a base to be fixed to the vehicle at a location enabling manipulation of the actuator by a rider of the vehicle, a manually operable lever pivotally mounted on the base so as to pivot about a predetermined axis, a braking force division member pivotally mounted on said lever so as to move therewith while pivoting about a second axis space from said predetermined axis but generally parallel thereto, cable end retaining means on said member to operatively retain an end of each of said cables, and wherein said retaining means are unequally spaced from said second axis so as to be on opposite sides thereof.

A preferred form of the present invention will now be described by way of example with reference to the accompanying drawings, wherein:

FIG. 1 schematically depicts a brake actuator;

Figure 1:
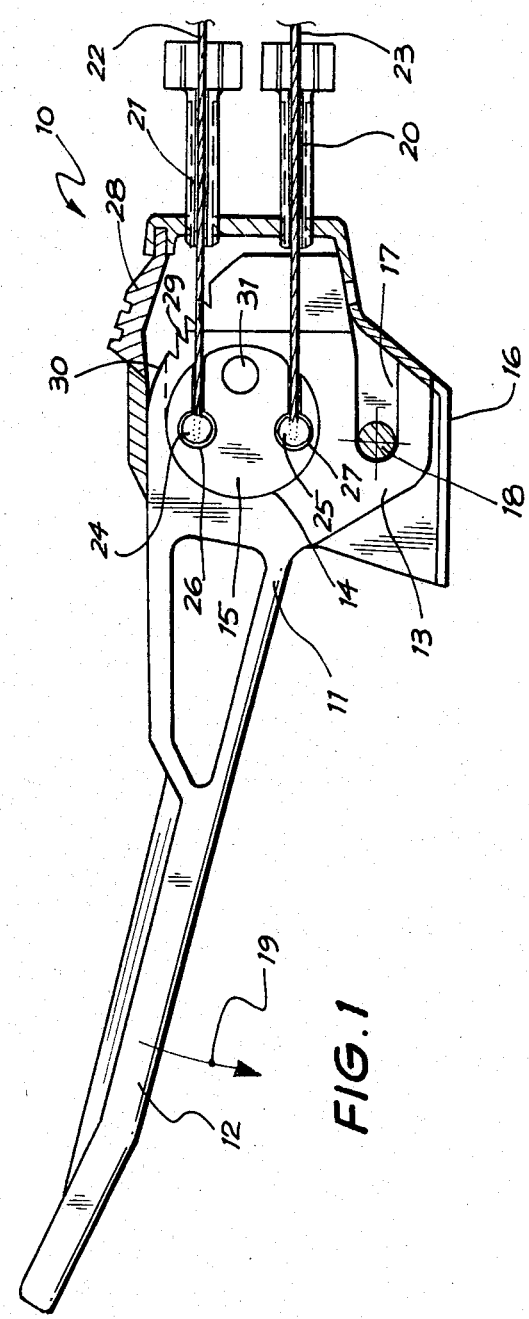
Figure 4:
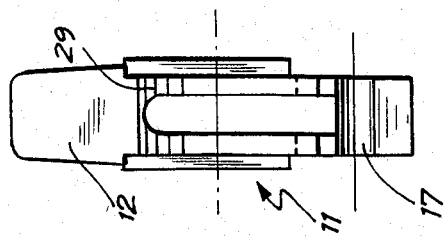
FIG. 4 is an end elevation of the handle of FIG. 2.
Figure 2:
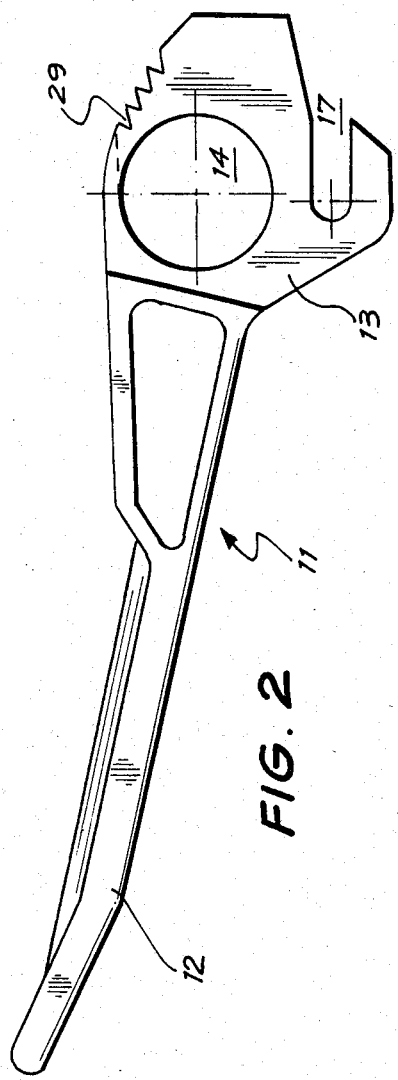
FIG. 2 is a side elevation of the operator manipulated handle of the actuator of FIG. 1.
Figure 3:
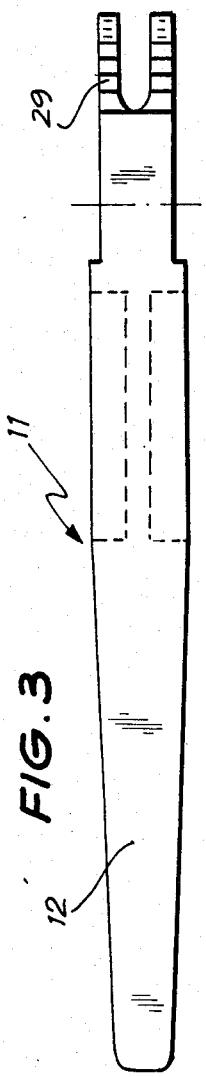
FIG. 3 is a plan view of the handle of FIG. 2.

Firstly with particular reference to FIG. 1, there is depicted a brake actuator 10 to be mounted on the handle bars of a velociped, which velociped employs cables to operate the front and rear brake calipers. The actuator 10 includes an operator manipulable handle 11 which has a lever portion 12 and a head 13. The head 13 defines a cylindrical cavity 14 within which is slidably located a braking force division member 15 having a disc configuration. Accordingly the member 15 is free to rotate about its longitudinal axis. The lever portion 11 is located within a housing 16 which is mounted on the handle bars of the velociped. The housing 16 is hollow so as to encompass the head 13, while passing through the interior of the housing 16 so as to be located within a slot 17, formed in the head 13, is a pin 18.

In operation movement of the hand gripped lever portion 12 in the direction of the arrow 19 causes pivoting of the lever portion 11 about the pin 18.

The housing 16 has two cable entries 20 and 21 which slidably support cables 22 and 23 so that movement of the lever portion 11 causes movement of the cables 22 and 23.

It has been found advantageous to vary the braking force of the front and rear brakes so that more of the braking is done via the front wheels. This is achieved by applying a greater force to the cable 22 relative to the cable 23. Each cable 22 and 23 has a head 24 or 25 which is securely located within a cavity 26 or 27 formed in the member 15.

In operation as the lever portion 11 is caused to pivot about the pin 18, the member 14 is caused to move leftward taking with it the extremities of the cables 22 and 23. However, since the head 25 of the cable 23 is located closer to the pin 18 than the head 24 of the cable 22, a greater force will be exerted on the cable 22. The braking force applied to the cables 22 and 23 is proportional to the point of attachment from the centre of rotation of the member 15. Accordingly as the head 24 is located closer to the centre of rotation of the member 15, a greater force is applied to it. It should further be appreciated that as the member 15 is slidingly supported within the cavity 14 so as to provide for the uneven adjustment of the cables 22 and 23.

The housing 16 has secured to it a safety catch 28 which is of flexible material so as to be deflectable inwardly to engage the ratchet 29 formed on the lever portion 11. In operation of this catch 28, the lever portion 11 would be actuated so as to pivot about the pin 18 and then the catch 28 depressed so that its barb 30 is engaged with the teeth of the ratchet 29 to thereby secure the lever portion 11 in its rotation condition. This provides a safety braking force to the cables 22 and 23. To release the catch 28, the lever portion 11 need only be further rotated in the direction of the arrow 19 thereby allowing the catch 28 to return to its depicted position under its own resilient action.

Figure 5:
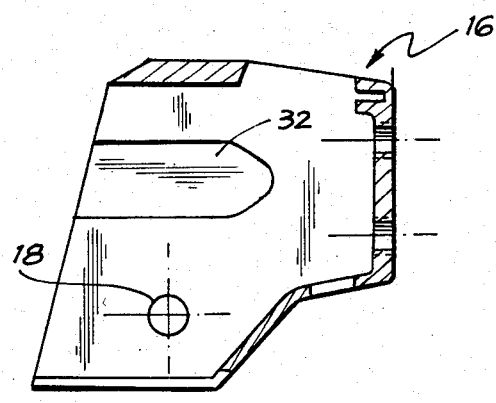
FIG. 5 is a side elevation of the housing to be fixed to the handle bars of a velociped.
Figure 6:
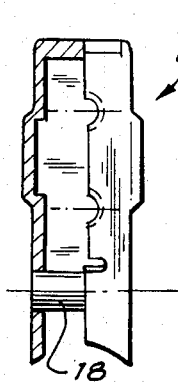
FIG. 6 is a part sectioned end elevation of the housing of FIG. 5.
Figure 7:
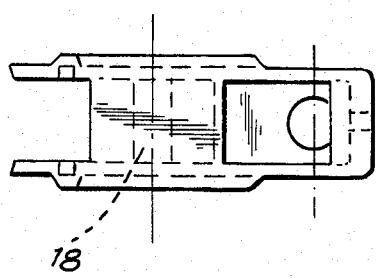
FIG. 7 is a plan view of the housing of FIG. 5.
Figure 8:
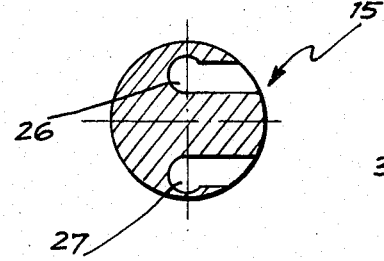
FIG. 8 is a sectioned elevation of a braking force adjustment member to be mounted within the handle of FIG. 2
Figure 9:
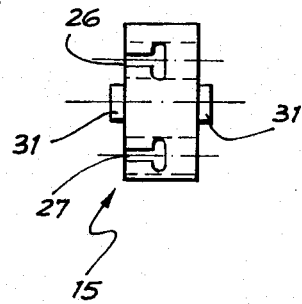
FIG. 9 is an end elevation of the adjustment member of FIG. 8.
Figure 10:
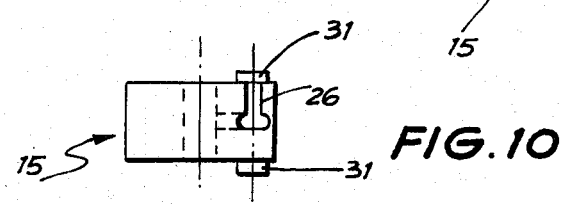
FIG. 10 is a further end elevation of the adjustment member of FIG. 8.

To provide for the safe operation of the brake actuator 10, should one of the cables 22 or 23 break or become excessively loose, the member 15 is provided with a projection 31 which is slidably located within a slot 32 (FIG. 5). Should one of the cables 22 or 23 become inoperative, then the member 15 would rotate about its own central axis until the projection 31 engaged one of the sides of the slot 32 thereby limiting any further rotation.

The operating effective lengths of the cables 22 and 23 is adjustable to compensate for brake wear and cable stretch by the cable entries 20 and 21 being adjustably threadably received within the housing 16.

What I claim is:

1. A brake actuator for a vehicle having a front and rear wheel and a brake assembly operatively associated with each wheel, and a brake cable extending from each assembly and coupled thereto so as to cause actuation thereof to brake the wheels, said actuator comprising a base to be fixed to the vehicle at a location enabling manipulation of the actuator by a rider of the vehicle, a manually operable lever pivotally mounted on the base so as to pivot about a predetermined axis, a braking force division member directly pivotally mounted on said lever so as to move therewith about said predetermined axis while pivoting about a second axis space from said predetermined axis but generally parallel thereto, and cable end retaining means on said member to operatively retain an end of each of said cables, wherein said retaining means are unequally spaced from said second axis so as to be on opposite sides thereof, said lever includes a handle portion and a head portion, said head portion being formed with a cylindrical opening co-axial with said second axis, and said member is slidingly received within said opening.

2. The actuator of claim 1 wherein said member is of a disc configuration.

3. The actuator of claim 1 wherein said base defines a hollow open ended housing, and said head portion is located within said housing.

* * * * *